May 16, 1967 E. D. NEEDHAM ETAL 3,319,497
WORK-PIECE STABILIZING MEANS
Filed March 18, 1965 2 Sheets-Sheet 1

INVENTORS:
Earl D. Needham
Frederick A. Skasik
BY

Attorney

May 16, 1967  E. D. NEEDHAM ETAL  3,319,497
WORK-PIECE STABILIZING MEANS

Filed March 18, 1965  2 Sheets-Sheet 2

INVENTORS:
Earl D. Needham
Frederick A. Skasik
BY
Roland A. Gunderson
Attorney

United States Patent Office 3,319,497
Patented May 16, 1967

3,319,497
WORK-PIECE STABILIZING MEANS
Earl D. Needham and Frederick A. Skasik, Albuquerque, N. Mex., assignors to the United States of America as represented by the United States Atomic Energy Commission
Filed Mar. 18, 1965, Ser. No. 440,964
5 Claims. (Cl. 82—38)

ABSTRACT OF THE DISCLOSURE

A cylindrical work-piece steady rest for a lathe or vertical boring mill having arcuate work-piece supports with roller means disposed adjacent opposite ends thereof, means for securing the supports to a longitudinally or vertically and laterally adjustable mounting means attached to the lathe or mill, the securing means providing an axis of rotation from the work-piece support, and adjustable yielding means operatively associated with the securing means for urging the support roller means against the work-piece.

---

The present invention relates generally to work-piece steadying means for use with metal removing devices and more particularly to such steadying means for facilitating the machining of long, thin-walled cylinders.

The machining of thin-walled cylinders has previously presented considerable difficulties since these cylinders, which are relatively easily deformable, cannot be rigidly held by conventional fixtures to prevent or minimize tool chatter. Consequently, in order to machine such cylinders expensive special fixtures were previously required for each different cylinder configuration with layers of tape, lead bands, or adherent masses of plastic materials being applied to the cylinder to reduce tool chatter by damping resonant vibration of the cylinder. Also, another objectionable drawback to these previous machining practices is that the machining of the cylinder was attained by using a single metal removing tool in a series of light cuts, which practice added greatly to the time and expense of machining cylinders.

The present invention aims to overcome or substantially minimize the above and other shortcomings or drawbacks in the machining of thin-walled cylinders by providing a work piece steadying device or steady rest which supports the cylinder for turning without distorting the cylinder and also supports the cylinder in such a manner that vibration damping means as above mentioned are no longer required.

An object of the present invention is to provide a new and improved steady rest means for supporting hollow work pieces during the removal of metal therefrom.

Another object of the present invention is to provide means for supporting cylinders during machining thereof in a vibration free manner without distorting the cylinder.

A further object of the present invention is to facilitate the machining of cylinders by utilizing support means capable of maintaining cylinders, some of which may be out-of-round, in a predetermined orientation.

A still further object of the present invention is to provide work-piece support means capable of minimizing or eliminating machine tool chatter in a less expensive and a more efficient and reliable manner than previously available.

While the description of the invention is primarily directed to the machining of cylinders with vertical boring mills it is to be understood that other hollow objects having a surface of revolution such as spheres, hemispheres, tapered tubular objects, and others may be supported by the steady rest of the present invention, and that machining or metal removing mechanisms other than vertical boring mills may be utilized.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 1:
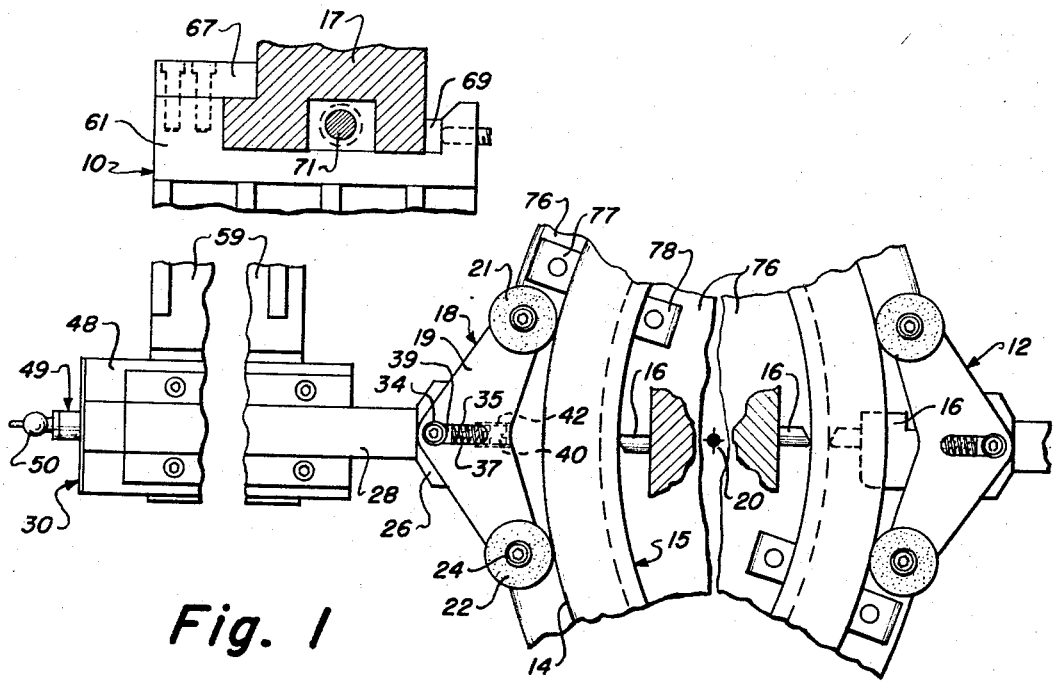
FIG. 1 is a top plan view of the present invention as it may appear in an operational application with portions of the cylinder being supported and the support means broken away and with the milling machine being shown in fragmentary form, all in the interest of clarity and brevity of description.

Described generally the steady rest means of the present invention as shown in the drawings at 10 and 12 include a roller assembly which is positioned in an abutting relationship with an outer surface or wall 14 of a cylindrical object 15 having surface portions removed by metal cutting tools 16 of a suitable metal removing machine such as a vertical boring mill. The steady rest portions are preferably disposed on opposite sides of the cylindrical object with the axis of rotation of the latter therebetween as indicated by reference numeral 20 so that the portions effectively cooperate with each other to maintain the intermediate cylindrical object in a predetermined orientation with respect to the tools 16. With the steady rest means so positioned, the roller assemblies enable the cylindrical object 15 to be rotated and yet provide adequate support to maintain the cylindrical object in a vibration free mounting that is capable of resisting lateral forces of the cutting tools against the walls of the cylindrical object so efficiently that tool chatter is virtually non-existent.

The steady rest means may be carried by suitable supporting members such as the vertically oriented ways of a vertical boring mill (a fragmentary portion of one such vertical way is shown at 17). The steady rest means are preferably movable on the vertical ways or other supporting members so that they may be used for machining objects of various sizes or be positioned in different locations on the same object.

Inasmuch as the steady rest portions 10 and 12 may be essentially identical to each other only one will be described below for purposes of brevity while keeping in mind that the descriptive details are equally applicable to both.

Described in greater detail the steady rest portion 10 is provided with a roller assembly 18 which may comprise a generally crescent or arcuate shaped roller mount 19 having a threaded aperture adjacent each end thereof for receiving suitable wheel-like structures or rollers 21 and 22. These rollers may be formed of any suitable material but are preferably of a resilient material such as nylon or rubber. The durometer values of the rollers may be preselected for the machining of particular metals; for example, relatively soft rubber rollers may be most appropriate for machining objects of aluminum and other non-ferrous alloys. Each roller may be provided with a bushed central aperture through which a screw 24 may be passed to engage the threads in the threaded aperture of the mount 19 to secure the rollers thereto. The screws 24 are preferably provided with threadless shank portions and should fit within the roller apertures with sufficient clearance as to enable the rollers to rotate freely. Also, if desired, washers may be placed on either side of the roller to provide the desired clearance. As shown in the drawings the diameter of the rollers should be great enough so that the rollers laterally project beyond the underlying marginal surfaces of the roller mount to assure that the rollers rather than the mount engages the wall of the object to be machined. Also, the circumferential spacing between the points of contact of the rollers on each roller assembly with the object to be machined is preferably never less than about one-sixteenth of the circumference of the object to assure that the latter is maintained in vertical alignment and that the cutting tools have adequate resistance for effecting minimal tool chatter during all phases of the metal removing operation.

The roller mount 19 may be attached adjacent the center thereof to an underlying base plate 26 which may, in turn, be rigidly secured to an elongated I-beam or member 28 so as to define a bifurcated or forked construction. The I-beam 28 may be carried by and movable with respect to a slide assembly 30 as will be described in greater detail below. The plate 26 may be fastened to the I-beam 28 by using a suitable number of screws 32 or other suitable fastening means while the roller mount 19 is preferably secured to the base plate 26 by a single pin or screw 34 which may extend through a slot or aperture 35 in the mount 19 at a location intermediate the rollers to provide the roller mount 19 with an axis of rotation. This screw 34 may be provided with a thickened threadless shank portion along the length of the screw 34 corresponding to the thickness of the roller mount 19 and have a diameter slightly less than that of the roller mount aperture 35 to assure that the roller assembly 18 may be pivoted or rotated about the axis provided by the screw 34.

Figure 2:
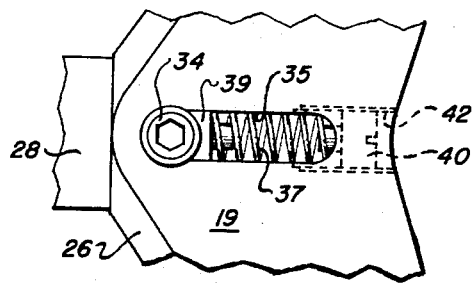
FIG. 2 is an enlarged fragmentary plan view of the present invention.

A novel feature of the present invention is in the coupling between the roller mount 19 and the base plate 26 in that the roller assembly 18 may be provided with sufficient "give" or "freedom" to permit the machining of objects initially out-of-round or objects which tend to go out-of-round during machining. In order to provide this feature as best shown in FIG. 2, the aperture 35 may be of an elongate or rectangular configuration with a rounded end surface adjacent the screw 34 and be disposed in the roller mount such that it extends from a location adjacent the vertex of the "convex" side of the mount 19, i.e., the side of the mount furthest away from the cylindrical object, towards the vertex of the "concave" side of the mount 19, thus enabling the roller mount 19 to move in a direction generally parallel to the axis of the I-beam 28 along a length of the aperture without readjusting the position of the I-beam. A suitable yieldable device such as a helically wound compression spring 37 is preferably positioned in the aperture 35 so as to continually urge the roller mount toward the cylindrical object while simultaneously providing for movement in the opposite direction against the action of the spring 37. This spring 37 may be held in the aperture 35 by spring retainers 39 and 40 disposed at opposite ends of the spring 37. Each spring retainer may be provided with a centrally disposed projection which extends into the spring for maintaining the spring within the slot. Additionally, retainer 39 may be provided with inwardly curved end conforming to the configuration of the screw 34 to provide a desirable contacting surface therebetween. Spring retainer 40 is preferably selectively movable with respect to retainer 39 so as to provide a means of adjusting the compression of spring 37 for providing the roller assembly 18 with a desired amount of freedom or give. A satisfactory construction for achieving this selective spring compression may be to provide the amount with a threaded bore 42 communicating with the aperture 35 and the vertex of the concave side of the roller mount and by forming the retainer 40 with a threaded outer surface so that it engages the threaded bore as to be selectively movable therein. With this construction any desired amount of freedom—say, for example, two degrees, may be given to the roller assembly and, if desired, the retainer 40 may be turned inwardly against the spring 37 a sufficient distance as to render the mount essentially rigid.

Figure 3:
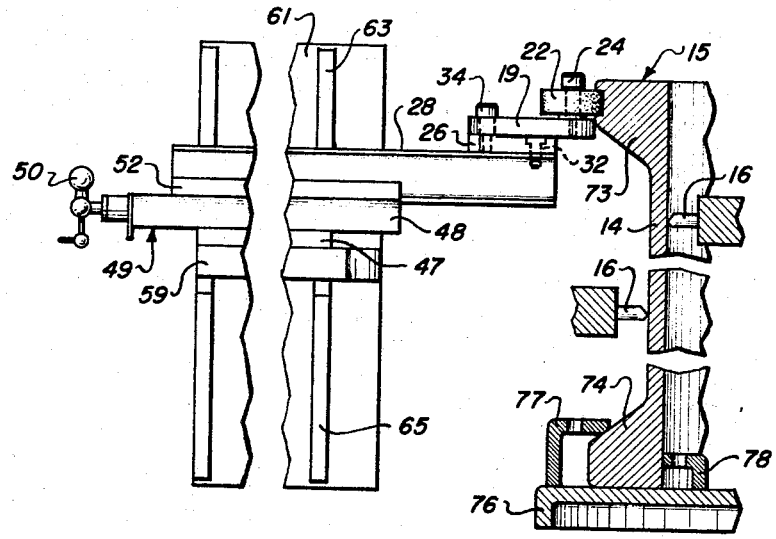
FIG. 3 is a side elevational view of the present invention in a working relationship with a cylinder.
Figure 4:
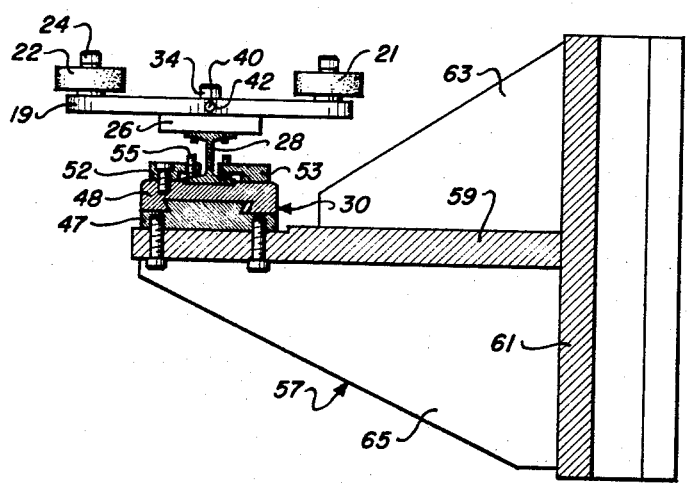
FIG. 4 is a partially sectioned elevational view of the present invention.

The slide assembly 30 may comprise a pair of rectangular metal members 47 and 48, one overlying the other as best shown in FIGS. 3 and 4, with a suitable coupling arrangement therebetween so as to enable the upper member 48 to be selectively movable with respect to the lower member 47. For example, a screw action slide of any desired construction as generally indicated at 49 may be used between the two members 47 and 48 such that handle 50 may be selectively turned in either direction to move the upper member 48 and the roller assembly 18 attached thereto toward or away from the cylindrical object 15. This screw slide 49 is capable of moving the roller assembly toward the cylindrical object 15 a distance determined by the effective lengths of the metal members 47 and 48 which may be of lengths longer or shorter than those shown. In some instances, for example, when milling a cylindrical object of a relatively small diameter, the adjustment project of the slide may be insufficient to move the roller assembly against the walls of the cylindrical object. Thus, it may be preferable to mount the I-beam 28 upon the upper member 48 in such a manner that it may be selectively moved with respect to the upper member 48 so that the combined movement provided by the I-beam and the slide is sufficient to move the rollers against a smaller cylindrical object. A desired coupling between the I-beam 28 and the upper metal member 48 of the slide may be provided by fastening a pair of plates 52 and 53 having flange-like portions to the member 48 in any suitable manner such that the flange-like portions of the plates are disposed adjacent to each other and spaced from the upper surface of the member 48 for providing a receiving space for the flanges of the I-beam 28 with flange-like portions of the plates overlying the I-beam flanges. Set screws 55 may then be utilized in threaded holes in the flange-like portion of one or both plates 52 and 53 overlying the I-beam flanges to hold the I-beam 28 in a selected position.

In order to position the roller assembly 18 in a desired location against the outer wall 14 of the cylindrical object, the lower member 47 of the slide assembly 30 may be bolted or otherwise secured to a support structure 57 carried by a vertical way 17 of a milling machine or any other suitable rigid mount. The support structure, as shown, may comprise a horizontally disposed plate 59 with the slide assembly 30 secured to one end thereof and a vertically disposed plate 61 secured to the other end. Suitable reinforcing members such as ribs 63 and 65 may be attached to and extend from the vertical plate 61 along the horizontal plate 59 to provide rigidity to the support structure. The ribs 63 and 65 may be welded or otherwise secured to the plates 59 and 61. The vertical plate 61 may be provided with suitable fixtures such as a removable flange 67 and a selectively movable abutment 69 so as to enable the support structure to be selectively positioned in any desired location on the vertical way 17. If desired, the support structure 57 may be secured to the vertical way so as to be provided with vertical motion during the metal removing operation for assuring adequate support for the cylindrical object during all phases of metal removal. For example, the support structure may be attached in a suitable manner (not shown) to the threaded rod 71 adjacent the vertical way 17, which rod 71 provides the vertical movement of the cutting tools 16.

In a typical operation, a cylindrical object such as a long thin-walled cylinder 15, which may have enlarged sections 73 and 74 at opposite ends thereof, may be placed upon turntable 76 of a vertical boring mill and secured in place by suitable fixtures shown generally at 77 and 78. The steady rest means 10 and 12 may then be positioned on the vertical ways of the milling machine so that the oppositely disposed roller assemblies 18 may contact the cylinder 15 at a desired location on the vertical length of the cylinder. The roller assemblies may then be moved into an abutting relationship with the outer wall 14 of the cylinder by the slide assembly 30 or by both the slide assembly and the adjustable I-beam. The location on the cylinder against which the rollers contact is shown by way of example as being the enlarged section 73 of the cylinder 15 but may be at any location with or without the location being changed during the metal removing operation. The cutting tools 16, three of which are shown in FIG. 1 with the position of the outer tool being changed in FIG. 3 for ease of illustration, may then be moved into a metal removing relationship with the inner and outer walls of the cylinder. These cutting tools are preferably disposed in an essentially vertical alignment with or directly opposite from the roller assemblies to assure that forces generated during metal removal do not deform the cylinder and also assure that tool chatter is minimal. The turntable may then be started and the metal removal operation carried out in a usual manner.

It will be seen that the present invention sets forth a significant contribution to the metal working art in that the difficulties in machining thin walled and hollow metal objects due to tool chatter and objectionable deformation by fixtures are overcome in a simple yet highly efficient and practical manner. By employing the steady rest means of the present invention in a metal removing operation a plurality of cutting tools, such as, for example, the three cutting tools shown in the drawings or any other suitable number, may be used simultaneously with each tool making relatively heavy cuts as compared to cuts previously obtainable. If desired, the roller assembly may, in some instances, be separated from the I-beam and slide assembly and attached directly to a sidehead of the milling machine. Also, while two steady rest portions are shown it may be desirable to use additional portions in some instances—say, for example, when removing metal from a large, very thin walled cylinder.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. A work-piece steadying device for facilitating the machining of hollow thin-walled objects having a surface of revolution, said device comprising a base member secured to a rigid support structure and selectively positionable thereon, adjustable means secured to said member comprising a plurality of portions at least one of which is selectively movable with respect to another of said portions for varying the effective length of said adjustable means, and roller means carried by said adjustable means for abutting against an outer side wall of a rotatable object to facilitate relative movement of said object with respect to said device while maintaining said object in stable orientation, said roller means comprising an elongate support with rotatable means disposed adjacent opposite ends thereof to abut said side wall at circumferentially spaced apart locations, means securing said one portion to said elongate support intermediate the spaced apart rotatable means, said securing means providing an axis of rotation for said support, and selective adjustable yieldable means associated with said securing means, said securing means and said yieldable means providing and faciltating desired relative movement of said roller means with respect to said one portion such that means for removing metal from said object engage the latter at locations intermediate said spaced apart locations.

2. Steady rest means of the character described comprising in combination support structure carried by and selectively positionable on a rigid member, a slide assembly carried by said structure at a location spaced from said rigid member comprising a pair of elongate portions one of which is selectively movable with respect to the other portion, an elongate member carried by said one portion and selectively movable with respect thereto, a roller assembly at one end of said elongate member comprising an elongate plate with an aperture adjacent each end thereof, a pair of rollers of yieldable material, means associated with each of said rollers and projecting into each of said apertures to secure said rollers to said plate at spaced apart locations, a slot of generally rectangular configuration in said plate intermediate said apertures and rollers, means in said slot securing said plate to said elongate member, spring means disposed in said slot and abutting against said means in said slot, and further means in said plate abutting against said spring means and selectively movable to control movement of said plate with respect to said elongate member.

3. Work positioning means for a vertical milling machine having vertically oriented ways at generally oppositely disposed portions of a rotatable table, comprising on each of said ways, a horizontally adjustable beam member, bifurcated means carried by each of said beam members adjacent an end thereof remote to said ways for positioning said bifurcated means generally intermediate said ways with the axis of rotation of said table therebetween, each said bifurcated means having a central portion overlying said beam member and having an elongated slot in said portion in general alignment with said beam member, a pin disposed in said slot and secured to said beam member, an adjustable spring disposed in said slot and cooperating with said pin to continually urge said bifurcated means toward said axis, and rollers adjacent each end of said bifurcated means and projecting beyond peripheral edges thereof for abutting a surface on a hollow object disposed on and rotatable with said table.

4. The work positioning means claimed in claim 3 wherein a metal removing means is disposed in generally vertical alignment with at least one of said bifurcated means.

5. The work positioning means claimed in claim 4 wherein at least a single metal removing means is disposed intermediate said bifurcated means.

References Cited by the Examiner

UNITED STATES PATENTS

| | | | | |
|---|---|---|---|---|
| 804,131 | 11/1905 | Johnson | | 82—38 |
| 2,753,739 | 7/1956 | Dreier. | | |
| 2,791,928 | 5/1957 | Saddoris | | 82—38 |

WILLIAM W. DYER, Jr., *Primary Examiner.*

L. VLACHOS, *Assistant Examiner.*